(12) United States Patent
Zises (10) Patent No.: US 9,530,059 B2
(45) Date of Patent: *Dec. 27, 2016

(54) PERSONAL AUGMENTED REALITY

(71) Applicant: eBay Inc., San Jose, CA (US)

(72) Inventor: Matthew Scott Zises, San Jose, CA (US)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,706

(22) Filed: Dec. 9, 2015

(65) Prior Publication Data

US 2016/0171305 A1 Jun. 16, 2016

Related U.S. Application Data

(63) Continuation of application No. 13/340,141, filed on Dec. 29, 2011, now Pat. No. 9,240,059.

(51) Int. Cl.
*G06K 9/00* (2006.01)
*G06T 11/00* (2006.01)
*G06T 11/60* (2006.01)

(52) U.S. Cl.
CPC ........... *G06K 9/00671* (2013.01); *G06T 11/00* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 4,539,585 A | 9/1985 | Spackova et al. | |
| 6,112,226 A | 8/2000 | Weaver et al. | |
| 7,240,025 B2 | 7/2007 | Stone et al. | |
| 7,827,074 B1 | 11/2010 | Rolf | |
| 7,848,764 B2 | 12/2010 | Riise et al. | |
| 9,240,059 B2 | 1/2016 | Zises et al. | |
| 2002/0094189 A1 | 7/2002 | Navab et al. | |
| 2002/0116286 A1 | 8/2002 | Walker et al. | |

(Continued)

FOREIGN PATENT DOCUMENTS

| WO | WO-2013101903 A2 | 7/2013 |
|---|---|---|
| WO | WO-2013101903 A3 | 7/2013 |

OTHER PUBLICATIONS

"U.S. Appl. No. 13/019,918, Final Office Action mailed Mar. 27, 2014", 29 pgs.

(Continued)

*Primary Examiner* — Nirav G Patel
(74) *Attorney, Agent, or Firm* — Schwegman, Lundberg & Woessner, P.A.

(57) ABSTRACT

Image data comprising an image of an environment is received from a mobile video device located at the environment. An image of a marker is extracted from the received image for use in identifying the location of the mobile video device. A location associated with the marker is extracted from a database and the extracted location is sent as the location of the mobile video device. Also received is a request for information about an item in the environment that is of interest to a user of the mobile video device. A location in the environment associated with the item of interest is identified, and the information indicating the location of the item is transmitted to the mobile device for display within an image of the environment on the mobile video device. The item of interest may be displayed as an augmented reality within an image of the environment.

20 Claims, 9 Drawing Sheets

(56) References Cited

U.S. PATENT DOCUMENTS

| | | |
|---|---|---|
| 2003/0028873 A1 | 2/2003 | Lemmons |
| 2003/0101105 A1 | 5/2003 | Vock |
| 2005/0001852 A1 | 1/2005 | Dengler et al. |
| 2005/0171864 A1 | 8/2005 | Nakade et al. |
| 2007/0015586 A1 | 1/2007 | Huston |
| 2008/0046956 A1 | 2/2008 | Kulas |
| 2008/0194323 A1 | 8/2008 | Merkli et al. |
| 2008/0207357 A1 | 8/2008 | Savarese et al. |
| 2008/0285940 A1 | 11/2008 | Kulas |
| 2009/0006208 A1 | 1/2009 | Grewal et al. |
| 2009/0019487 A1 | 1/2009 | Kulas |
| 2009/0144624 A1 | 6/2009 | Barnes, Jr. |
| 2009/0232354 A1 | 9/2009 | Camp, Jr. et al. |
| 2009/0262137 A1 | 10/2009 | Walker et al. |
| 2009/0319373 A1 | 12/2009 | Barrett |
| 2009/0324137 A1 | 12/2009 | Stallings et al. |
| 2010/0171758 A1 | 7/2010 | Maassel et al. |
| 2011/0004517 A1 | 1/2011 | Soto et al. |
| 2011/0078305 A1 | 3/2011 | Varela |
| 2011/0084983 A1 | 4/2011 | Demaine |
| 2011/0128300 A1 | 6/2011 | Gay et al. |
| 2011/0143731 A1 | 6/2011 | Ramer et al. |
| 2011/0148924 A1 | 6/2011 | Tapley et al. |
| 2012/0084812 A1 | 4/2012 | Thompson et al. |
| 2012/0099800 A1 | 4/2012 | Llano et al. |
| 2012/0105475 A1 | 5/2012 | Tseng |
| 2012/0113141 A1 | 5/2012 | Zimmerman et al. |
| 2012/0185492 A1 | 7/2012 | Israel et al. |
| 2012/0197764 A1 | 8/2012 | Nuzzi et al. |
| 2012/0215612 A1 | 8/2012 | Ramer et al. |
| 2012/0327115 A1 | 12/2012 | Chhetri et al. |
| 2013/0106910 A1 | 5/2013 | Sacco et al. |
| 2013/0116922 A1 | 5/2013 | Cai et al. |
| 2013/0170697 A1 | 7/2013 | Zises |
| 2013/0198002 A1 | 8/2013 | Nuzzi et al. |

OTHER PUBLICATIONS

"U.S. Appl. No. 13/019,918, Final Office Action mailed Aug. 16, 2015", 36 pgs.

"U.S. Appl. No. 13/019,918, Non Final Office Action mailed Aug. 29, 2013", 25 pgs.

"U.S. Appl. No. 13/019,918, Non Final Office Action mailed Dec. 29, 2014", 30 pgs.

"U.S. Appl. No. 13/019,918, Respnse filed Nov. 6, 2015 to Final Office Action mailed Aug. 6, 2015", 21 pgs.q.

"U.S. Appl. No. 13/019,918, Response filed Apr. 29, 2015 to Non Final Office Action mailed Dec. 29, 2014", 26 pgs.

"U.S. Appl. No. 13/019,918, Response filed Jun. 26, 2014 to Final Office Action mailed Mar. 27, 2014", 13 pgs.

"U.S. Appl. No. 13/019,918, Response filed Nov. 27, 2013 to Non Final Office Action mailed Aug. 29, 2013", 9 pgs.

"U.S. Appl. No. 13/283,416, Final Office Action mailed Aug. 7, 2015", 25 pgs.

"U.S. Appl. No. 13/283,416, Final Office Action mailed Nov. 25, 2014", 26 pgs.

"U.S. Appl. No. 13/283,416, Non Final Office Action mailed Feb. 2, 2016", 32 pgs.

"U.S. Appl. No. 13/283,416, Non Final Office Action mailed Apr. 2, 2015", 31 pgs.

"U.S. Appl. No. 13/283,416, Non Final Office Action mailed Jul. 10, 2014", 29 pgs.

"U.S. Appl. No. 13/283,416, Response filed Feb. 25, 2015 to Final Office Action mailed Nov. 25, 2014", 12 pgs.

"U.S. Appl. No. 13/283,416, Response filed Jul. 2, 2015 to Non Final Office Action mailed Apr. 2, 2015", 13 pgs.

"U.S. Appl. No. 13/283,416, Response filed Nov. 10, 2014 to Non Final Office Action mailed Jul. 10, 2014", 12 pgs.

"U.S. Appl. No. 13/283,416, Response filed Dec. 7, 2015 to Final Office Action mailed Aug. 7, 2015", 15 pgs.

"U.S. Appl. No. 13/340,141, Examiner Interview Summary mailed Aug. 4, 2015", 3 pgs.

"U.S. Appl. No. 13/340,141, Examiner Interview Summary mailed Dec. 11, 2014", 3 pgs.

"U.S. Appl. No. 13/340,141, Final Office Action mailed Feb. 6, 2014", 19 pgs.

"U.S. Appl. No. 13/340,141, Final Office Action mailed Sep. 26, 2014", 22 pgs.

"U.S. Appl. No. 13/340,141, Non Final Office Action mailed Apr. 9, 2015", 13 pgs.

"U.S. Appl. No. 13/340,141, Non Final Office Action mailed Jun. 5, 2014", 18 pgs.

"U.S. Appl. No. 13/340,141, Non Final Office Action mailed Aug. 29, 2013", 15 pgs.

"U.S. Appl. No. 13/340,141, Notice of Allowance mailed Sep. 10, 2015", 9 pgs.

"U.S. Appl. No. 13/340,141, Response filed Feb. 26, 2015 to Final Office Action mailed Sep. 26, 2014", 12 pgs.

"U.S. Appl. No. 13/340,141, Response filed May 6, 2014 to Final Office Action mailed Feb. 6, 2014", 12 pgs.

"U.S. Appl. No. 13/340,141, Response filed Aug. 6, 2015 to Non Final Office Action mailed Apr. 9, 2015", 11 pgs.

"U.S. Appl. No. 13/340,141, Response filed Sep. 5, 2014 to Non Final Office Action mailed Jun. 5, 2014", 14 pgs.

"U.S. Appl. No. 13/340,141, Response filed Dec. 30, 2013 to Non Final Office Action mailed Aug. 20, 2013", 13 pgs.

"U.S. Appl. No. 13/359,630, Final Office Action mailed Sep. 22, 2015", 29 pgs.

"U.S. Appl. No. 13/359,630, Final Office Action mailed Nov. 29, 2013", 21 pgs.

"U.S. Appl. No. 13/359,630, Non Final Office Action mailed Jun. 7, 2013", 23 pgs.

"U.S. Appl. No. 13/359,630, Non Final Office Action mailed Oct. 29, 2014", 29 pgs.

"U.S. Appl. No. 13/359,630, Notice of Non-Compliant Amendment mailed Apr. 23, 2015", 3 pgs.

"U.S. Appl. No. 13/359,630, Response filed Mar. 30, 2015 to Non Final Office Action mailed Oct. 29, 2014", 31 pgs.

"U.S. Appl. No. 13/359,630, Response filed Mar. 31, 2014 to Final Office Action mailed Nov. 29, 2013", 17 pgs.

"U.S. Appl. No. 13/359,630, Response filed May 21, 2013 to Restriction Requirement mailed Apr. 29, 2013", 10 pgs.

"U.S. Appl. No. 13/359,630, Response filed Jun. 23, 2015 to Non-Compliant Amendment, mailed Apr. 23, 2015", 31 pgs.

"U.S. Appl. No. 13/359,630, Response filed Oct. 7, 2013 to Non Final Office Action mailed Jun. 7, 2013", 15 pgs.

"U.S. Appl. No. 13/359,630, Response filed Mar. 22, 2016 to Final Office Action mailed Sep. 22, 2015", 30 pgs.

"U.S. Appl. No. 13/359,630, Restriction Requirement mailed Apr. 29, 2013", 6 pgs.

"Australian Application Serial No. 2012362467, Office Action mailed Mar. 24, 2015", 3 pgs.

"Australian Application Serial No. 2012362467, Response filed Aug. 28, 2015 to Office Action mailed Mar. 24, 2015", 20 pgs.

"Canadian Application Serial No. 2,856,869, Office Action mailed Oct. 14, 2015", 4 pgs.

"Definition of Homogeneous Coordinates", Wikipedia on Mar. 5, 2011 via Internet Archive WayBackMachine, [Online]. Retrieved from the Internet: <https://web.archive.org/web/20110305185824/http://en.wikipedia.org/wiki/Homogeneous_coordinates>, (Nov. 17, 2014), 10 pgs.

"Definition of Polar Coordinate System", Wikipedia on Oct. 11, 2011 via Internet Archive WayBackMachine, [Online]. Retrieved from the Internet: <https://web.archive.org/web/20111008005218/http://en.wikipedia.org/wiki/Polar_coordinate_system>, (Nov. 17, 2014), 25 pgs.

"European Application Serial No. 12862340.2, Extended European Search Report mailed Dec. 21, 2015", 5 pgs.

"European Application Serial No. 12862340.2, Response filed Feb. 3, 2015", 11 pgs.

"International Application Serial No. PCT/US2012/071770, International Preliminary Report on Patentability mailed Jul. 10, 2014", 7 pgs.

(56) References Cited

OTHER PUBLICATIONS

"International Application Serial No. PCT/US2012/071770, International Search Report mailed May 13, 2013", 2 pgs.

"International Application Serial No. PCT/US2012/071770, Written Opinion mailed May 13, 2013", 5 pgs.

"MLB At Bat 11", [Online]. Retrieved from the Internet: <URL: http://texas.rangers.mlb.com/mobile/atbat/?c_id=tex>, (Accessed Dec. 22, 2011), 3 pgs.

"Mobitv", MobiTV, [Online]. Retrieved from the Internet: <URL: http://www.mobitv.com/>, (Accessed Mar. 30, 2015), 1 pgs.

"Slingbox", Sling Media, Inc., [Online]. Retrieved from the Internet: <URL: http://www.slingbox.com/>, (Accessed Mar. 30, 2015), 4 pgs.

Kraft, Adam, "Real Time Baseball Aguemented Reality", Washington University in St. Louis, (Dec. 6, 2011), 10 pgs.

Mulloni, Alessandro, et al., "Handheld augmented reality indoor navigation with activity-based instructions", Proceedings of the 13th international conference on human computer interaction with mobile devices and services, (2011), 10 pgs.

Vlahakis, Vassilios, et al., "Archeoguide: An Augmented Reality Guide for Archaeological Sites", IEEE Computer Graphics and Application vol. 22, No. 5, (2002), 52-60 pgs.

Vlahakis, Vassilios, et al., "Archeoguide: first Results of an Augmented Reality, Mobile Computing System in Cultural Heritage Sites", Virtual Reality, Archeology, and Cultural Heritage, (2001), 9 pgs.

"U.S. Appl. No. 13/019,918, Non Final Office Action mailed Jun. 2, 2016", 31 pgs.

"U.S. Appl. No. 13/283,416 Response Filed May 2, 2016 to Non-Final Office Action mailed Feb. 2, 2016", 12 pgs.

"U.S. Appl. No. 13/283,416, Notice of Allowance mailed May 26, 2016", 9 pgs.

"U.S. Appl. No. 13/283,416, Response filed May 2, 2016 to Non final Office Action mailed Feb. 2, 2016", 12 pgs.

"U.S. Appl. No. 13/359,630, Non Final Office Action mailed Jun. 13, 2016", 40 pgs.

"Canadian Application Serial No. 2,856,869, Response filed Apr. 11, 2016 to Office Action mailed Oct. 14, 2015", 20 pgs.

"How to Write Advertisements that Sell", A. W. Shaw Co.,from System , the magazine of Business, (1912).

PERSONAL AUGMENTED REALITY

This application is a continuation of U.S. patent application Ser. No. 13/340,141, filed on Dec. 29, 2011, the benefit of priority of which is claimed hereby, and which is incorporated by reference herein in its entirety.

TECHNICAL FIELD

This application relates to a method and system for providing augmented reality for the environment in which a user is watching an event live in a stadium.

BACKGROUND

An individual viewing a real-time event in person may desire information related to the real-time event, the people engaged in the real-time event, the locale of the real-time event, and even other viewers at the locale of the real-time event. Further, the viewing individual may desire that information in such as way as to augment his or her viewing of the event. Conventionally, the only such information available to the viewer is merely the fraction of the desired information, for example that information which entities controlling the real-time event may elect to provide at a scoreboard or other display at the real-time event. Even this information does not actually augment the real time event other than by being viewable in a general, and not personal (such as personal choice), way. Consequently, the individual viewer has no, or only a very limited, way of obtaining the desired information presented in a way that is most beneficial to that individual. In addition, sales organizations desire to target advertisements to the viewing individual at the locale, based on characteristics or location of the individual. Often, such organizations have only very limited ways of targeting such advertisements.

BRIEF DESCRIPTION OF THE DRAWINGS

The present disclosure is illustrated by way of example, and not by way of limitation, in the figures of the accompanying drawings in which.

DETAILED DESCRIPTION

Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

Example embodiments described herein provide systems and methods for augmenting one's experience at a real time in-person attendance of an event such as, in one embodiment, attending a baseball game at a ballpark. This may be accomplished by concurrently viewing the event at the ballpark using a camera such as on an iPhone, or a camera embodied in a mobile device such as an iPad. Such devices may herein be termed a "client device" or a "user device" or an iPhone or an iPad without limiting the type of device used. In example embodiments, environment image data containing an image of an environment is received by a system from a client device operated by a user, in one embodiment, viewing the ball game at the ballpark.

The user may wish to use the user device to watch the game with statistics the user is most interested in, such as statistics for one team, for one particular player, for one position, and the like. The user may also desire to have an embodiment which may be used to determine specific attributes of the ball park, such as type and location of a restaurant, handicapped bathrooms, an exit closest to where the user parked, and the like. The user may send the system a request for the desired information to augment the reality of the ball game being watched at the ballpark.

Likewise, marketing organizations, whether online ecommerce organizations or conventional "brick and mortar" organizations, may desire an embodiment that allows them to target ads to the user. These ads may be for items that are based on the user's purchase history, interests, or on the location of an organization closest to the ballpark that sells such items. Given different histories and interests of people, two people could be watching the same game at the same ballpark but have different ads targeted to them. Using appropriate image scaling, a selection of statistic or ad to be targeted, and its placement into an indicated location of the environment as an augmentation, may be implemented. As used herein, the statistic or targeted ad may be referred to herein as an "item" for ease of reference, and without losing generality. An image of the selected item is scaled to a scale that is based on dimensions determined from the environment image data for the environment. The dimensions may be determined based on a calculated distance to a focal point of the indicated location in the environment and/or on a marker located in the image of the environment. The scaled item image is augmented into the image of the environment at the indicated location to generate an augmented reality image. In some embodiments, the scaled item may be oriented to match an orientation of the indicated location in the environment. Technology useful in implementing augmented reality may be seen in U.S. patent application Ser. No. 13/283,416 filed Oct. 27, 2011 and entitled "SYSTEM AND METHOD FOR VISUALIZATION OF ITEMS IN AN ENVIRONMENT USING AUGMENTED REALITY,"

particularly FIGS. 1-5 thereof, and the text associated therewith. The foregoing patent application is owned by the owner of the present patent and is hereby incorporated by reference herein in its entirety.

By using embodiments of the present disclosure, a user may search for an item and augment an image of an environment with an image of the item that is a personal choice of the user. Because the user may create and view an augmented reality image of the environment including the selected item, the user easily views the selected item in the environment. Therefore, one or more of the methodologies discussed herein may obviate a need for time consuming data processing by the user in order to obtain requested statistics and the like. This may have the technical effect of reducing computing resources used by one or more devices within the system. Examples of such computing resources include, without limitation, processor cycles, network traffic, memory usage, storage space, and power consumption.

Embodiments may be implemented using wireless or other suitable technology. As discussed, the user may be watching a live baseball game in a ballpark. The system may have stored in its database relevant information about ballparks of interest, the information including location of various points within each ballpark, perhaps by ballpark coordinates, or by other appropriate locating markers such as ballpark section numbers and seat numbers. The system may also have stored in its database the players of relevant teams (e.g., teams in the league in which the current team plays), by number, position, or other identification, and their statistics. In the discussion that follows, queries or requests that may be made to the system by the user may be implemented as selection of predetermined queries available on a user interface ("UI") on a user device such as a UI of an iPad or an iPhone on which the user is watching the game live in the ballpark. For example, the user may select predetermined requests on the UI. This may also be accomplished, for example, by the user employing a UI on the user device to send a non-predetermined request (e.g., a request which is of the user's personal choice) to the system for statistics for the player being viewed, whose identity may also be sent to the system by the user by way of the UI, or may be otherwise recognized by the system by the technologies discussed more fully below. Similarly, the system database may have stored the team pitching rotation for starters and relievers for this and, perhaps, all relevant teams, and any players that are currently on the injured reserve list for each team. The database may also store the current league standing and the possible playoff scenarios based on current won/lost for each team, and the possibilities of wins and losses for teams leading up to the playoffs.

In one embodiment, the user may use the camera of a user device such as an iPhone or an iPad to provide context, such as the baseball game the user is watching in a ballpark, as mentioned above, along with requested items of information. In response, the system and the display of the user device may show items popping up to augment the reality of the game that is being watched. While the user is looking at the field using an iPad, he or she may aim the camera of the iPad for a close-up of a particular player. The player's image may be rendered on the display of the iPad during the real time baseball game, and player statistics for that player may also be rendered on the display by the system, responsive to the user's request for the statistics. This may be accomplished, for example, by the user employing a UI on the user device to send a request to the system for statistics for the player being viewed, whose identity may be sent to the system by the user by way of the UI, or otherwise recognized by the system as more fully discussed below.

In another embodiment, the system may include a video recognition system that recognizes images of the players, for example, by the player's team uniform number, to enable the system to correlate team, uniform number, and player in order to transmit the correct statistics for viewing if so requested. The system may, if desired, point to the particular player by arrow or other indicator when augmenting the reality of in-person watching of the game live, by presenting the player's statistics on the user device.

In another embodiment, the camera of the iPad may point from player to player and the system may recognize the players, by number recognition, or by other technology recognition such as facial recognition algorithms, or by RFID identification from an RFID chip embedded in the player's uniform. The user's favorite players may be found by matching an earlier prepared list of the user's favorite players located in an appropriate database, including the players' numbers or other identification, with the player identity that is so-recognizable by the system as the camera pans across the field. The recognition may be made by using the technology discussed above, the numbers being compared to those of the user's favorite players by database search as the user device scans a player. The system may then transmit the requested player statistics for rendering on the iPad display along with, for example, arrows pointing to the various favorite players on the screen of the user device as the camera pans across the field of play. Similarly, the ball itself may contain an RFID chip, and the above technology used to augment the reality of the ballgame on the iPad by using the detected path of the RFID chip within the ball to illustrate the trajectory of the ball.

Based on the above implementations, the user may request the statistics of a particular player; the statistics of his or her favorite player; how a player compares in various statistic areas with other players at the same position, how the particular player compares in batting average; or how the player compares in other statistics categories with other players in the league.

Another embodiment may show the user, for example by arrows, where friends of the user are seated in the stands of the ballpark. This may be implemented, as one example, by the user sending the system a query for the seat location of a friend. Responsive to this query, the system may read the friend's phone number from the user's cell phone contact list and, in conjunction with a global positioning service ("GPS") satellite system, determine the seat location, generally or specifically, of the cell phone that has the friend's phone number. The system may then, from the above stored ballpark coordinates, respond to the user with information as to the friend's seat location, including, if desired, placing an arrow on the display of the user device pointing to the location of the friend's seat, augmenting the viewer's personal reality of viewing the ballpark live. In an alternate embodiment, instead of GPS technology, the system may have stored in its database the names of people who purchased the various seats in the ballpark, and may then, upon request for the seating of a particular person, search for the name of that person to find the person's seat location. Again, if desired, an arrow pointing to the seat location may be placed upon the image of the user device in order to augment the reality of the live viewing of the game. In yet another embodiment, the friend may have posted on a social network such as Facebook the section, row, and seat number where that friend will be sitting. The user may then read this seating off the friend's Facebook wall and send that information to the system, for use by the system in augmenting the user device by, as one example, pointing on the device's display to the point in the ballpark where that seating is located. In still another embodiment, directions may be provided based on the user's preferences sent to the system with or as part of the request. For example, if the user requires elevators, the system will point the user in the direction that includes elevators, if the user needs a ramp, the system points to the direction including ramps. Otherwise the system may be free to point out directions using stairs.

In another embodiment, the iPhone or iPad may function as a "set of eyeglasses," providing the user with information relevant to the user's personal choices as the user moves the user device from place to place within the ballpark. For example, as the user walks out of the user's seating section towards the ballpark concourse the user device may, responsive to user query, show the location of ballpark locations that the user may be interested in, for example the closest bathroom, or a bathroom that is outfitted for the handicapped. This could be done by the camera of the user device transmitting to the system images of various locations of the ballpark, such as a marker showing a ballpark section number. As mentioned previously, the system may have previously stored in a database an image of the ballpark, with coordinates for various areas of the ballpark, perhaps keyed to various ballpark markers. The database may be searched using the marker transmitted from the camera, and the desired location may be rendered on the display of the user device along with the pointing information discussed above.

Other embodiments may include the user requesting the system to display the shortest path out of the stadium to where the user parked his or her car. The system may receive a feed of road traffic, and the user could request the parking lot exit from which to leave in order to encounter the least traffic, the fastest way home, or the route that has the least traffic, or the route that passes a particular restaurant, or that passes several restaurants on the way home, and the system could respond with that information for display on the user device.

In any of the above embodiments, as desired, the system may also access the user's purchasing history if, for example, the system is, or is associated with, an ecommerce system or other type of marketing system. The system may then along with, or separate from, the above augmented reality information, transmit advertisements to the user based on that purchasing history. In addition, the advertisements may be based on the location of the ballpark and indicate the location of a store near the ballpark that sells the subject matter of the advertisement. The system may, when sending statistics that were requested for a player, also include an advertisement showing where the jersey or other souvenirs of the player can be purchased, or where team memorabilia, such as championship pennant replicas may be purchased. Since the purchasing history is personal to the user, different users using the above methods would view the same game in the same ballpark, but would receive different responses to the same query from the system.

Figure 1:
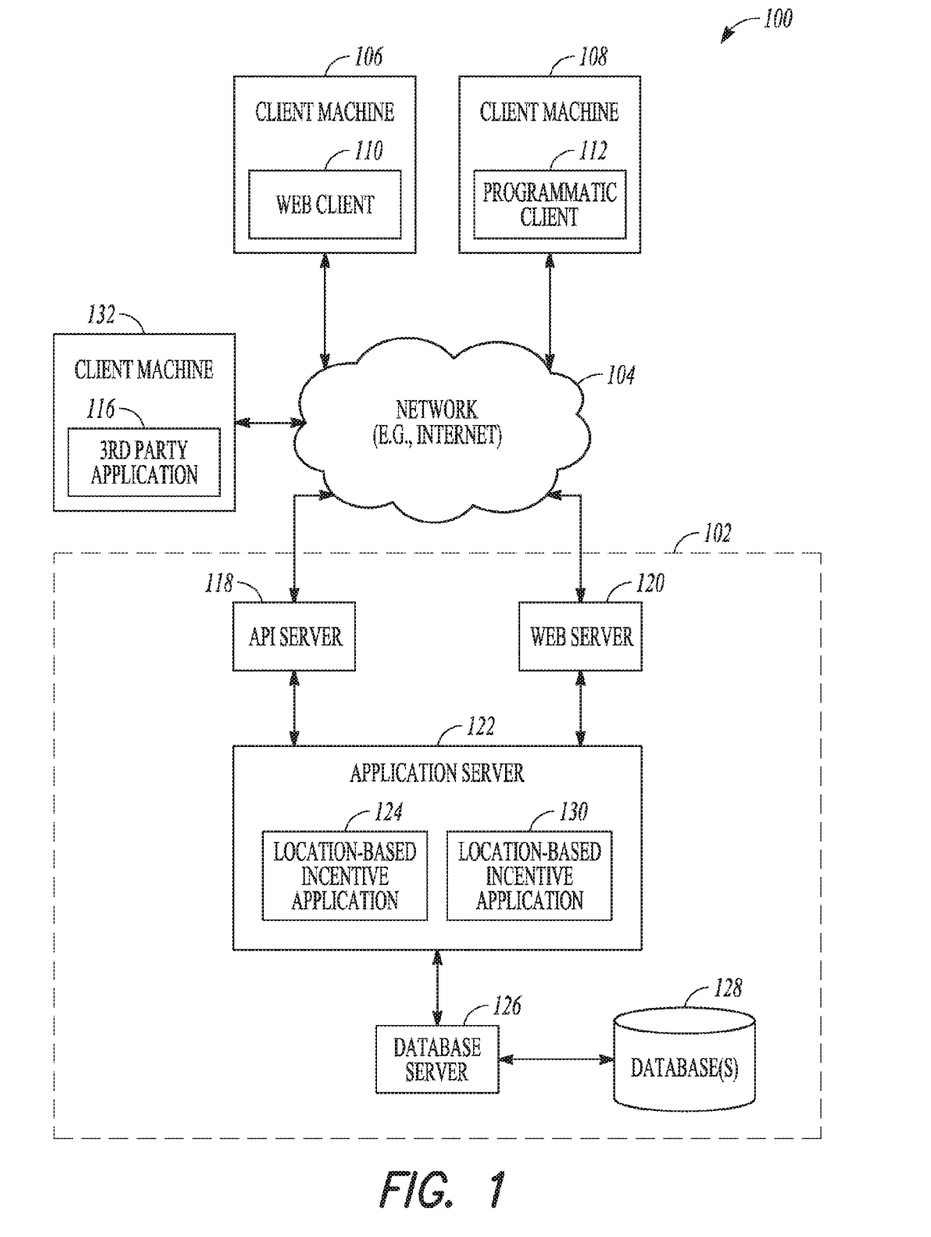
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users.

Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include transmitting, receiving (communicating) and processing data to, from, and regarding content and users of the network system 100. The data may include, but are not limited to, content and user data such as feedback data; user reputation values; user profiles; user attributes; product and service reviews and information, such as pricing and descriptive information; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or UIs. The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a mobile device 132 hosting a third party application 116. It may be appreciated in various embodiments the client machine 106, 108, or third party server 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

A mobile device 132, such as an iPad or an iPhone, as non-limiting examples, may also be in communication with the network-based publisher 102 via a web server 120. The mobile device 132 may include a portable electronic device providing at least some of the functionalities of the client machines 106 and 108. The mobile device 132 may include a third party application 116 (or a web client) configured communicate with application server 122.

Turning specifically to the network-based publisher 102, an application program interface (API) server 118 and a web server 120 are coupled to, and provide programmatic and web interfaces respectively to, one or more application servers 122. The application servers 122 may host one or more publication application (s) 124 and a location-based incentive application 130. The application servers 122 are, in turn, shown to be coupled to one or more database server(s) 126 that facilitate access to one or more database(s) 128.

In one embodiment, the web server 120 and the API server 118 communicate and receive data pertaining to statistics, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on other client machines (e.g., client machine 108 or mobile device 132 which, as previously indicated, may be an iPhone or an iPad).

A publication application(s) 124 may provide a number of publisher functions and services (e.g., listing, payment, etc.) to users that access the network-based publisher 102. For example, the publication application(s) 124 may provide a number of services and functions to users for listing goods and/or services for sale, facilitating transactions, and reviewing and providing feedback about transactions and associated users. Other publication applications (not shown) within or external to the network based publisher 102 may provide statistics for players, names of parties associated with ballpark seating, traffic information, map information, store locations, and the like.

The third party application 116 may execute on a third party server (not shown) and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

The network-based publisher 102 may provide a multitude of feedback, reputation, aggregation, and listing and price-setting mechanisms whereby a user may be a seller or buyer who lists or buys goods and/or services (e.g., for sale) published on the network-based publisher 102.

The application server 122 also includes a location-based application 130. The location-based application 130 communicates advertisements, some of which may offer incentives, to the mobile device 132 based on the mobile device 132 location and the purchase history or other indicated preferences of the user of the mobile device 132 as further described below.

Figure 2:
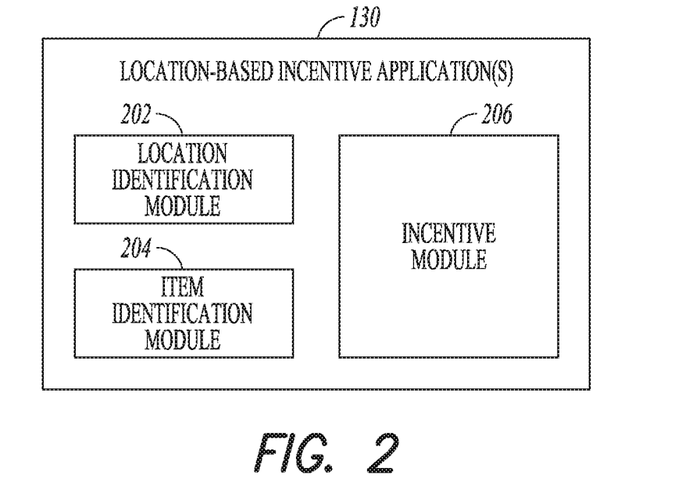
FIG. 2 is a block diagram illustrating an example embodiment of a location-based incentive application.

FIG. 2 is a block diagram illustrating an example embodiment of a location-based incentive application 130, which is provided as part of the network-based publisher 102. The location-based incentive application 130 has a location identification module 202, an item identification module 204, and an incentive module 206. The location identification module 202 determines a geographic location of the mobile device 132. The item identification module 204 identifies an item, such as statistics for a player, or for a plurality of players, specified by the user at the geographic location of the mobile device 132. The incentive module 206 communicates an incentive from one or more local merchants based on the identified item and the geographic location of the mobile device 132. These modules may be implemented in hardware, firmware, or any combination thereof. As outlined above, database 128 may contain purchase history of the user of the mobile device, as well as the aforementioned location.

In one embodiment, the location-based incentive application 130 receives a communication from the mobile device 132. For example, the communication may include a specification of an item and a location of the mobile device 132. Based on the specified item and the location of the mobile device 132, the incentive module 206 queries to retrieve results from the database server 126 and database 128 to determine and communicate incentives from local merchants to the mobile device 132.

Figure 3:
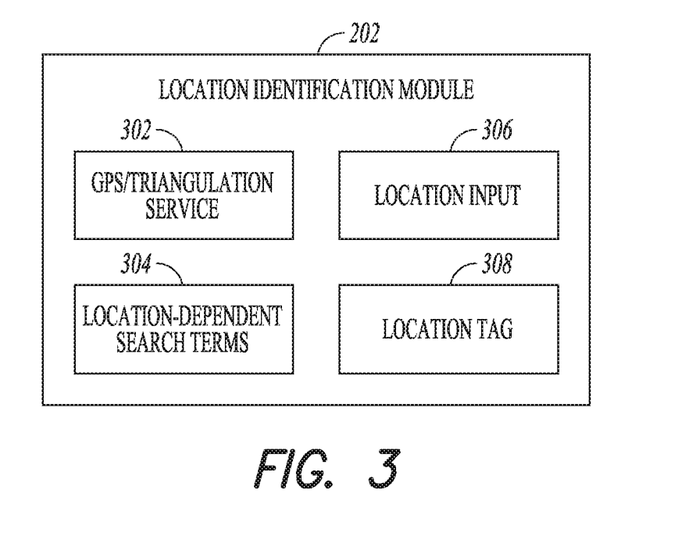
FIG. 3 is a block diagram illustrating an example embodiment of a location identification module.

FIG. 3 is a block diagram illustrating an example embodiment of the location identification module 202. The location of the mobile device 132 may be determined in many ways. For example, the mobile device 132 may be equipped with a GPS system that would allow the device to communicate the coordinates or location of the mobile device 132 to a GPS/triangulation module 302 of the location identification module 202. In another example, the location of the mobile device 132 may be determined by triangulation using wireless communication towers and/or wireless nodes (e.g. wi-fi hotspots) within wireless signal reach of the mobile device 132. Based on the geographic coordinates, the GPS/triangulation module 302 of the location identification module 202 may determine the geographic location of the mobile device 132 after consulting a mapping database (not shown). Furthermore, the general location of the mobile device 132 may be located when the user of the mobile device 132 logs onto a local internet connection, for example, at the above ballpark, at a hotel, at a coffee shop, or at any other organization based on location. The Internet Protocol address of the network connection at the ballpark may be uniquely identified by the location of the ballpark.

The location identification module 202 may also include a location input module 306 configured to determine a geographic location of the mobile device 132 by requesting the user to input an address, city, zip code or other location information on his/her mobile device 132. In one embodiment, the user may select a location from a list of locations or a map on the mobile device 132. For example, a user on the mobile device 132 inputs the location of the mobile device 132 via an application or a web browser on the mobile device 132. In another embodiment, the location input module 306 derives the geographic location of the user by communicating with third party application using respective APIs (Application Programming Interface).

The location identification module 202 may also include a location-dependent search term module 304. The location of the mobile device 132 may be inferred when the user of the mobile device 132 requests a search on the mobile device 132 using location-dependent search terms. For example, a user inputs a request, sometimes referred herein as a "search query," on his/her mobile device for "Best Japanese Restaurant in my locale," "exit nearest my seat," "exit nearest where my car is parked," and the like. The location-dependent search term module 304 queries and retrieves results from a database (not shown) that may determine the geographic location of the ballpark, the best Japanese restaurant near the user's location, perhaps based on opinions submitted by restaurant customers. Further, the user may request, or the user's history (such as on a social network) may show, a preference for a certain type of Japanese food. The system may then send directions to the closest Japanese restaurant that serves that preferred Japanese food, and not merely the closest Japanese restaurant. The location-dependent search term module 304 may have earlier received from the user the user's seating at the ballpark to use as needed for the above requests, or may have obtained the user's seating by having access to seats purchased by person, which information may also be used for determining the information to be supplied by the system responsive to the request.

The location identification module 202 may also include a tag module 308 configured to determine the geographic location of the mobile device 132 based on a tag associated with a unique geographic location. The tag may include, for example, a barcode tag (e.g. linear barcode or two dimensional bar code) or a Radio Frequency Identification (RFID) tag that is associated with a unique geographic location. For example, the user of the mobile device 132 may use his/her mobile device 132 to scan the tag placed at a landmark or store. The tag may be uniquely associated with the geographic location of the landmark or store. Such relationship may be stored in a database. The tag module 308 may then determine the geographic location of the mobile device 132 based on the tag after consulting the database.

Figure 4:
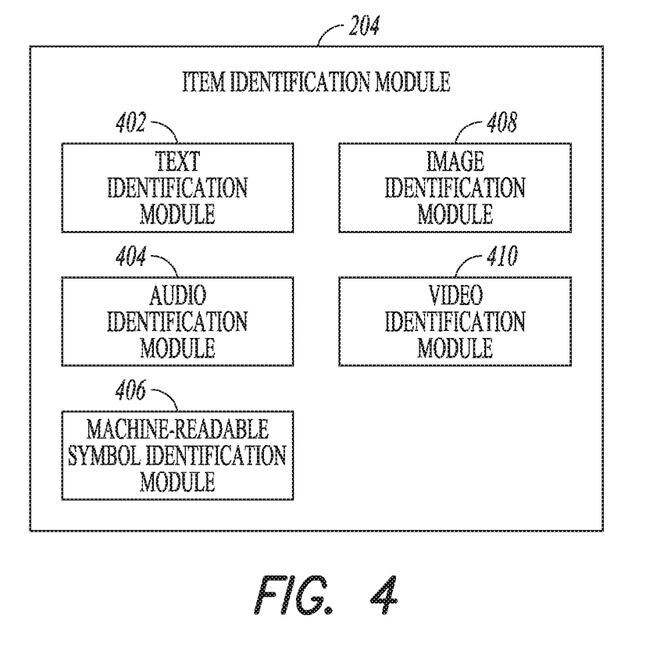
FIG. 4 is a block diagram illustrating an example embodiment of an item identification module.

FIG. 4 is a block diagram illustrating an example embodiment of an item identification module 204. The item specified by the user of the mobile device 132 may be determined in many ways using any of the following examples of modules: a text identification module 402, an audio identification module 404, a machine-readable symbol module 406, an image identification module 408, and a video identification module 410. The text identification module 402 may identity an item, such as statistics of a given player, or statics of players at a given position, specified by the user at the mobile device 132, in one embodiment using a text input from the user at the mobile device 132. For example, the user may enter a request for a particular player or for a particular position the user wishes. The text identification module 402 may further identify the item by comparing the request for the statistics with a database containing the statistics by player. For example, the user may specify "statistics for David Ortiz" as a category for searching. The text identification module 402 may then identify statistics that correspond to the text that was input by the user. In this case, the text identification module 402 identifies statistics that match the player input by the user (e.g. David Ortiz).

The audio identification module 404 may identify an item or a category of the item as specified by the user at the mobile device using an audio input from the user at the mobile device. For example, the user may speak "statistics" and "David Ortiz" at the location of the mobile device. The audio identification module 404 may include a speech recognition system (not shown) that enables the spoken words of the user to be transcribed into text.

The audio identification module 404 may be used to identify the specified statistics by comparing the name of the player transcribed from the audio with a database containing player statistics.

The machine-readable symbol module 406 may identify an item by having the user scan an RFID chip or any other machine-readable symbol such as a player's uniform number, at a distance, with his/her mobile device 132 as a machine-readable symbol reader. For example, the mobile device 132 may include an optical device (e.g. a lens) configured to capture an image of a player. The mobile device 132 may then upload the captured image to the machine-readable symbol module 406. The machine-readable symbol module 406 processes the captured image by querying and retrieving results from a database of machine-readable images to match the captured image of the player symbol with corresponding statistics. The machine-readable symbol module 406 may then identify the statistics specified by the user at the mobile device for rendering at the user device to augment the viewing or watching of the ball game in real time at the ballpark.

The image identification module 408 may identify an item by having the user take a picture of the item with his/her mobile device 132. Mobile devices commonly have an optical lens for capturing pictures. The mobile device 132 may then upload the picture, for example, of the player with certain recognizable features to the image identification module 408. The image identification module 408 analyzes the picture using an image recognition algorithm such as a facial feature recognition algorithm for facial recognition, or a numerical recognition algorithm jersey number recognition (neither algorithm shown) to match the uploaded picture with a corresponding image of an item. The image recognition algorithm consults a database of images and corresponding statistics or other information items to identify the uploaded picture.

The video identification module 410 may be configured to identify an item by having the user take a video of the player with the user's mobile device. Mobile devices commonly have an optical lens to capture video. The mobile device 132 may then upload the video (or a portion of the video) to the video identification module 408. The video identification module 410 analyzes the frames of the video (for example a jersey number or a player's facial image) using an image recognition algorithm (not shown) to match a frame of the video with a corresponding image of the player. The image recognition algorithm may query and retrieve results from a database of images and corresponding items to identify the uploaded video. For example, a user may take a video with his/her mobile device of a player walking on the field. The video identification module 410 recognizes the player and identifies the player's statistics, among other identifying and descriptive information about the player. In any of the above embodiments, the system may also return an advertisement to the user based on the user's purchase history if the system has access to that history. The system may also return an advertisement to the user based on the user's interest, such as an interest in a particular player. The system may also return an advertisement based on the location of the user device.

Figure 5:
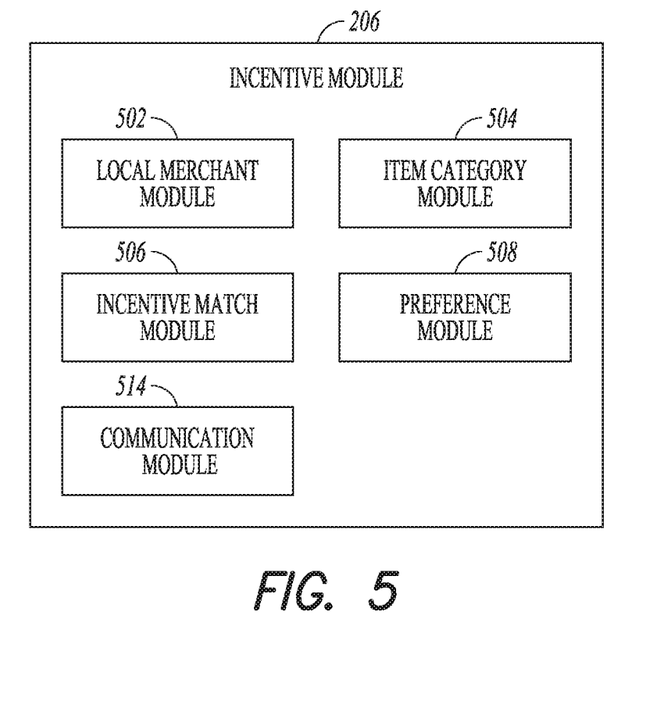
FIG. 5 is a block diagram illustrating an example embodiment of an incentive module.

FIG. 5 is a block diagram illustrating an example embodiment of the incentive module 206 that may used to execute the processes described herein. The incentive module 206 may include a local merchant module 502, an item module 504, an incentive match module 506, a preference module 508, an incentive receiver module 510, and a communication module 514.

The local merchant module 502 identifies at least one local merchant having at least one incentive based on the geographic location of the mobile device 132 as determined by the location identification module 202. A local merchant may be a merchant or retailer that is located within a predefined distance from the geographic location of the mobile device 132. In one embodiment, the local merchant module 502 identifies at least one local merchant with at least one incentive based on a search distance preference as specified in preference module 508.

It should be noted that the incentive of the local merchant may or may not correspond to the item identified by the user. For example, a local merchant may feature a special sale on shoes while the identified item corresponds to a digital camera. Once all local merchants having incentives are identified based on the geographic location of the mobile device 132 (using a database of incentives), the incentive match module 506 may filter all local merchants based on the identified item, such as a favorite player indicated by the user sending a request for information with respect to that player. In the previous example, the local merchant featuring a sale on sports memorabilia for the player may be filtered out from the search result. In addition, the filtering can be on the basis of the user's personal shopping history, and/or also preferences. For example, if it is known, such as (in only one example) that the user's Facebook account indicates a number of "Likes" for hats, incentives for hats may be sent. If the information indicates a number of "Dislikes" for shoes, incentives for shoes may not be sent.

The item category module 504 determines the item, in the current example, a player, specified by the user and identified by item identification module 204. The item category module 504 determines that a category of the item related to the player specified by the user falls into the category of athletic memorabilia.

The incentive match module 506 determines whether the identified item category corresponds to a category in at least one incentive of at least one local merchant as determined by the local merchant module 502. For example, a user specifies David Ortiz with his/her mobile device. The item is identified as player David Ortiz. The item identification module 204 generates an identity such as athletic memorabilia relating to David Ortiz. The local merchant module 502 identifies merchants with incentives local to the geographic location of the mobile device 132. The incentive match module 506 matches local merchants with incentives (sale or discount) on the specific memorabilia.

The communication module 514 communicates one or more incentives of the identified item from at least one local merchant to the mobile device 132. For example, a list of local merchants within a preset distance radius (e.g. one mile) of the mobile device 132 is displayed. The list of local merchants may include a sale or discount on the item identified by the user of the mobile device 132. The list may also include a list of recommended merchants (having an incentive on the identified item) that are located beyond the preset distance radius.

In another embodiment, the communication module 514 communicates one or more incentives of the identified category of the items from at least one local merchant to the mobile device 132. For example, a list of local merchants within a preset distance radius (e.g. a block) of the mobile device 132 is displayed. The list of local merchants may include a sale or discount on similar or related items to the identified item specified by the user of the mobile device 132. The list may also include a list of recommended merchants (having an incentive on similar items to the identified item) that are located beyond the preset distance radius.

Figure 6:
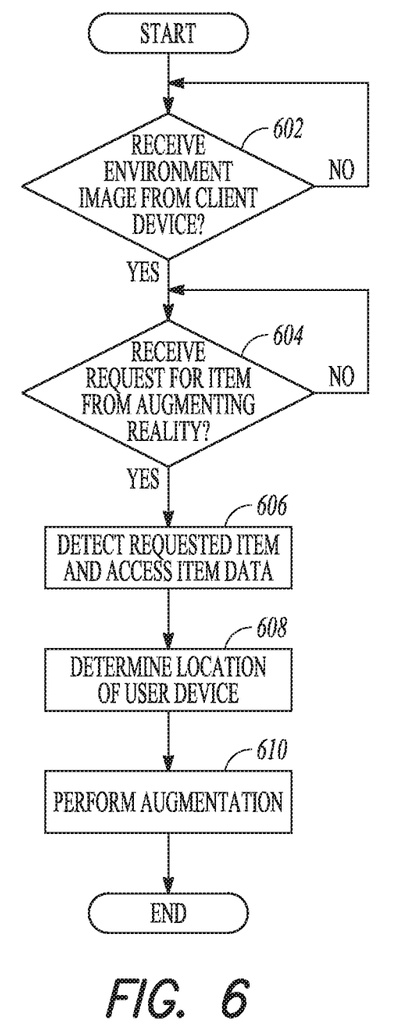
FIG. 6 is a flow chart illustrating a method for augmenting personal, real-time, viewing of an event by a user at the location of the event.
Figure 7A:
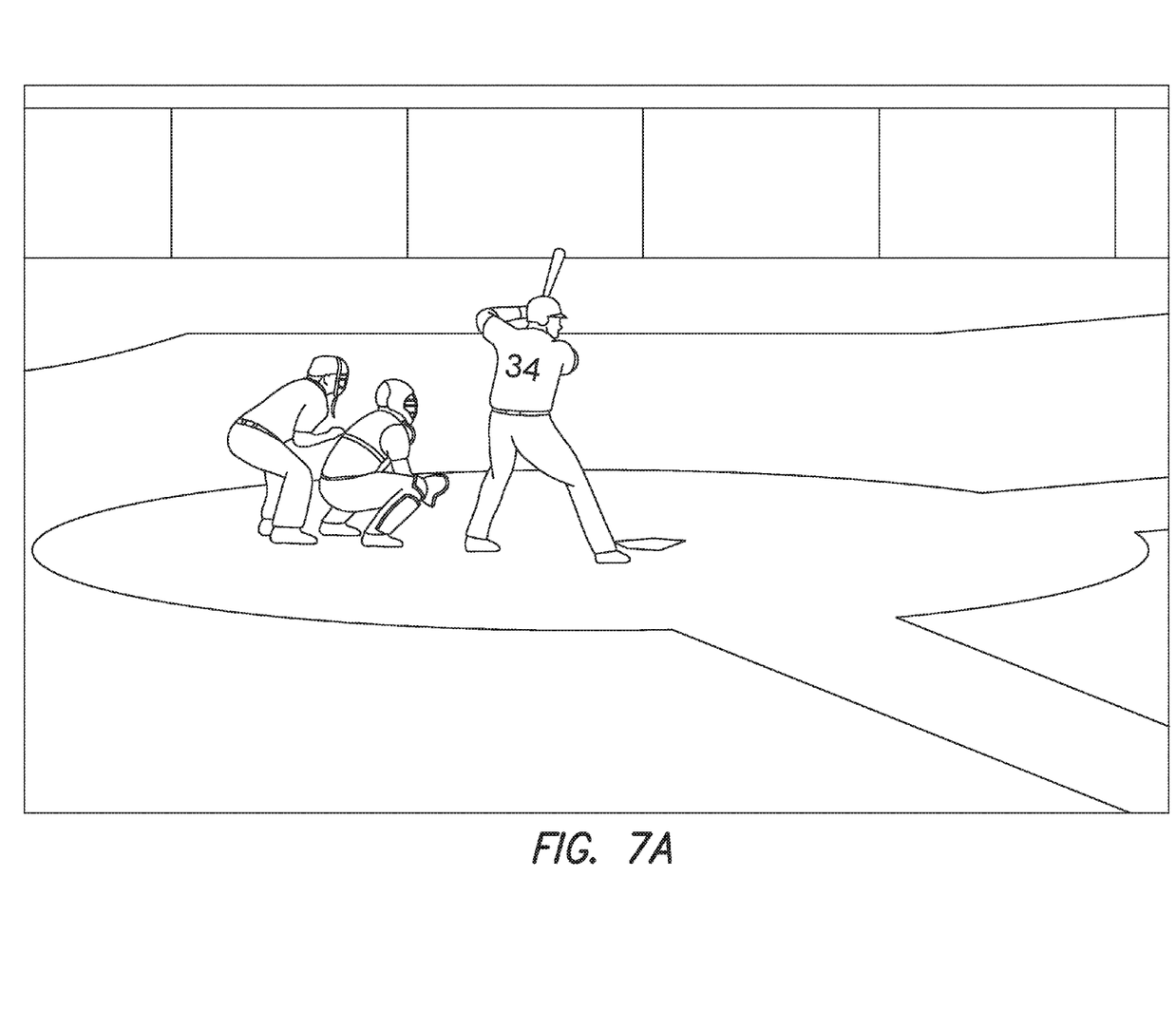
FIG. 7A is an illustration of a ballgame at a ballpark.
Figure 7B:
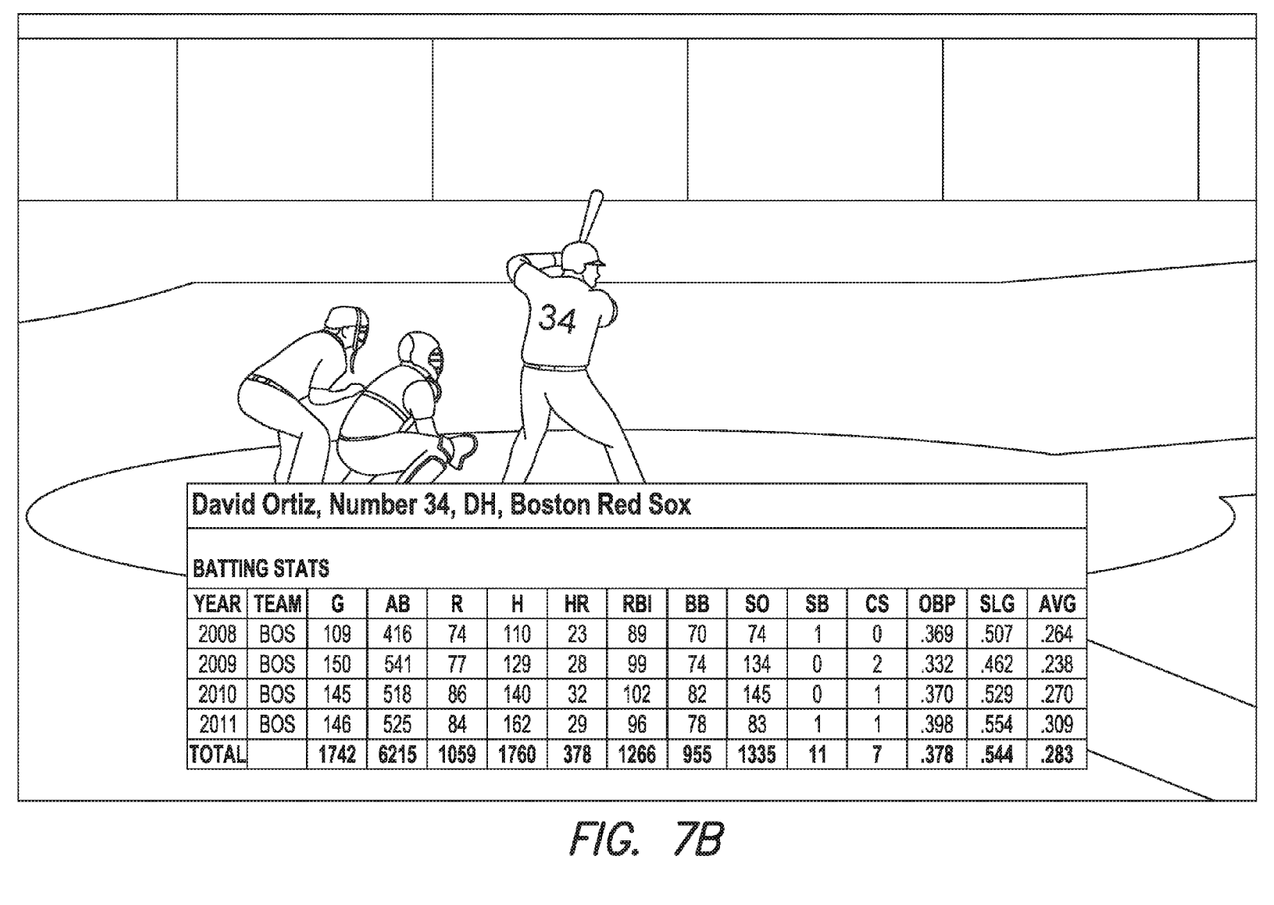
FIG. 7B is an illustration of the ball game of FIG. 7A with statistics of the player on second base, as requested by the user.

FIG. 6 is a flowchart of a method 600, according to an embodiment, for augmenting personal, real-time, in-person viewing of an event at a location by a user. If an image of the environment, such as a ball park and a ball game, and a request for an item for augmenting the reality of the user's real-time viewing, are received from the user device as at 602, 604 (in any order) the system may detect the requested item and accesses the item data as at 606 for use in augmenting the user's personal reality. This would include steps depending on the request. For example, the user may wish to use the user device to watch a baseball game at a ballpark with augmentation comprising statistics the user is most interested in, such as statistics for a particular player. In this case, the user device, for example an iPhone, might send the image of FIG. 7A with the image of player number 34, David Ortiz, from the game the user is watching. The system may include a video identification system 410 such as discussed above with respect to FIG. 4, that recognizes images of the players, for example, by the player's team uniform number, so that the system may correlate team, uniform number, and player in order to transmit the correct statistics for viewing if so requested. In this case the system may detect from the uniform number (and team, as appropriate) that the player is David Ortiz, and may access the desired statistics for that player. The system may present the requested statistics as augmentation using the augmentation technology discussed above, with a result such as seen in FIG. 7B. The system may, if desired, point to the particular player by arrow when augmenting the reality of watching the game live by presenting the player's statistics.

In another example of using the method of FIG. 6, the requested item at 604 may be a request to show where a friend is seated. As discussed above, the system may use the GPS/triangulation technology 302 of FIG. 3 to locate the requested seating. As an alternative, the system may use seating information provided from the user, or from the friend's Facebook site to locate the seating. The system may then, using the augmentation technology already discussed, or other such appropriate technology, augment the user's view of the real-time in-person viewing by placing an arrow, such as that seen in FIG. 9A, pointing to the seating on the display of the user device while the camera of the device is viewing the ballpark, as seen in FIG. 9B. The actual location of the seating may be determined by the system as discussed generally above, by using ballpark coordinates, or by other appropriate locating markers such as ballpark section number and seat numbers, illustrated in FIG. 8, which may already be stored in the system's database. While the ballpark illustrated in FIG. 8 shows only the seating of the ballpark, well known technology may be employed to superimpose a grid of coordinates on the image of FIG. 8 and use the resultant map to locate the seating in order to implement the augmentation under discussion.

Also as discussed above with respect to the location-based applications 130, including incentive module 206, the system may use the user's location, to target advisements to the user. Technology for implementing advertisement targeting is discussed in more detail in U.S. patent application Ser. No. 13/050,769 filed Mar. 17, 2011, and entitled "TARGETED INCENTIVE ACTIONS BASED ON LOCATION AND INTENT," particularly FIGS. 7A-7C and the text associated therewith. The foregoing application is owned by the assignee of the present patent and is hereby incorporated herein by reference in its entirety.

Figure 8:
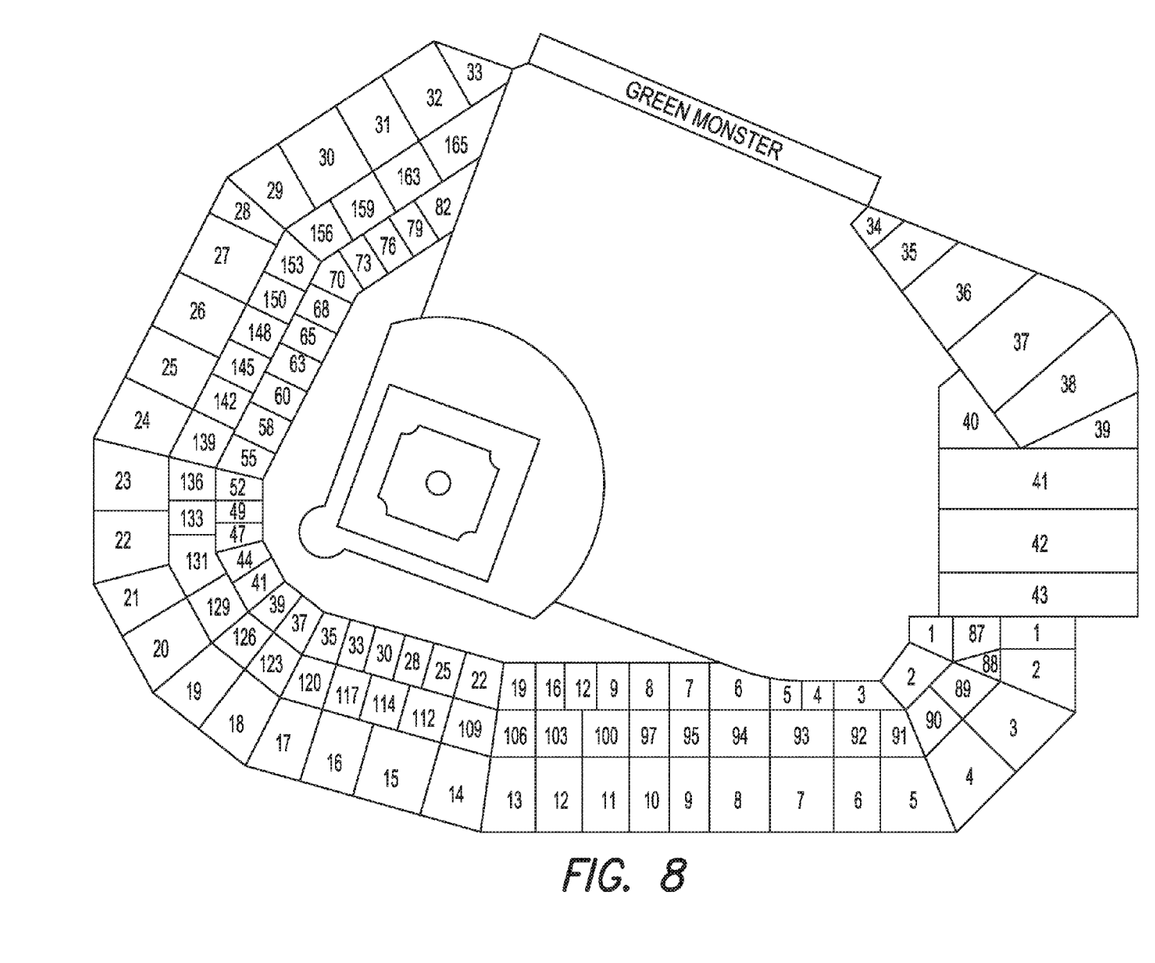
FIG. 8 is an illustration of seating and other locations in a ballpark.
Figure 9A:
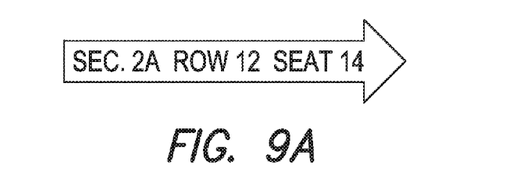
FIG. 9A is an illustration of one embodiment of personal augmentation for a user.
Figure 9B:
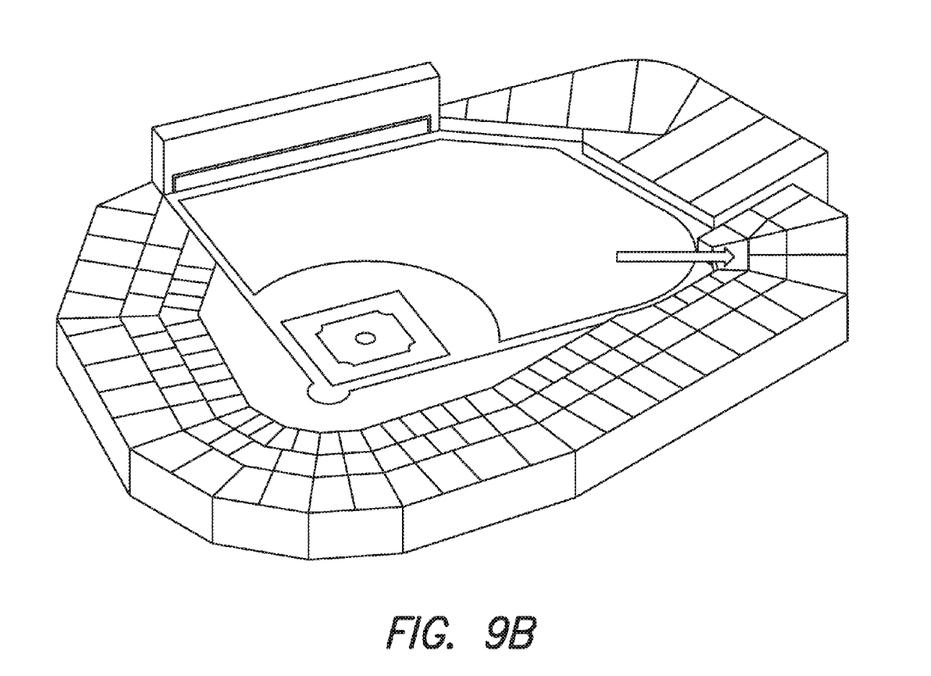
FIG. 9B is an illustration of augmenting the personal view of a user with the personal augmentation of FIG. 9A.
Figure 10:
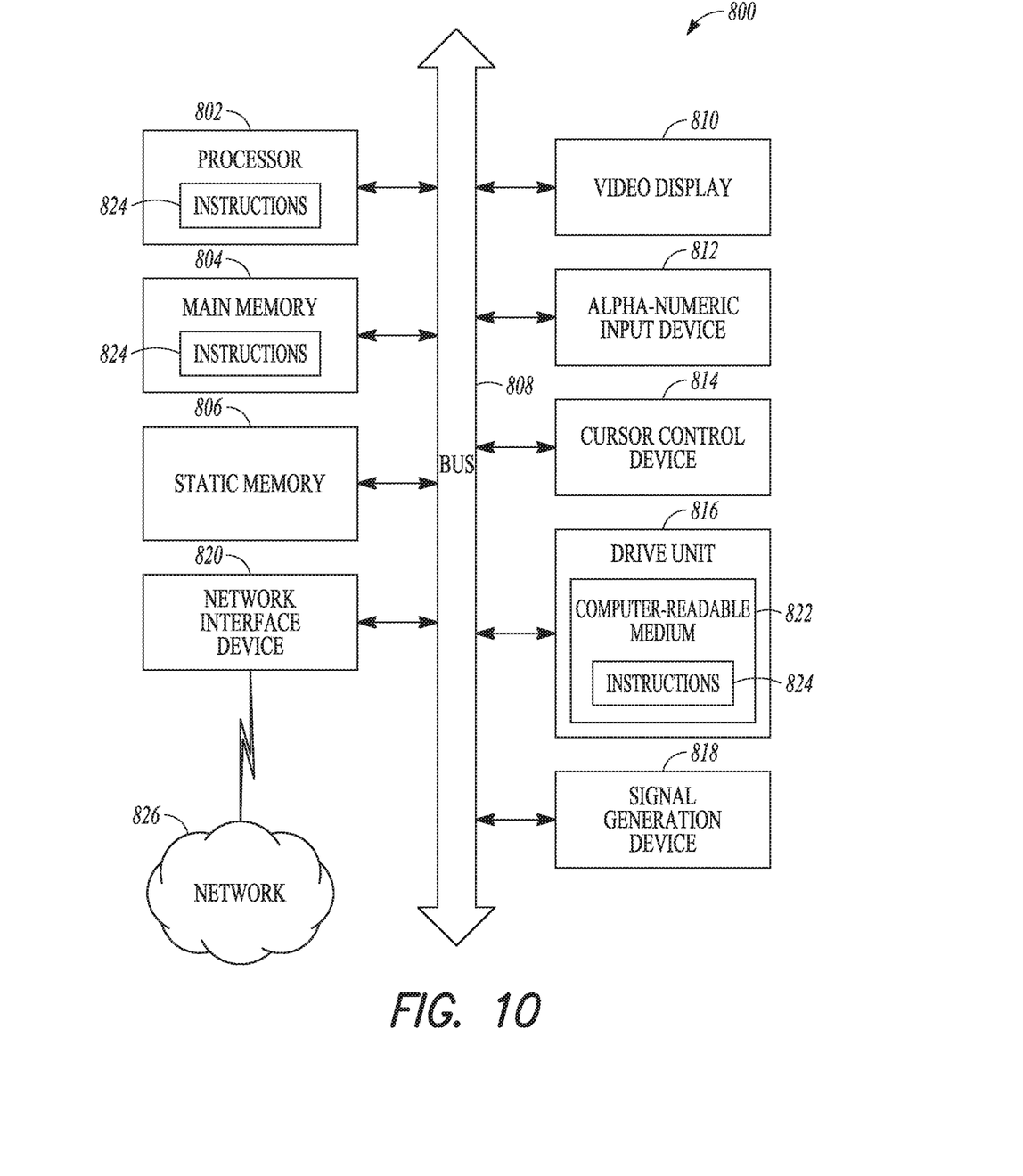
FIG. 10 shows a diagrammatic representation of machine in the example form of a computer system within which a set of instructions may be executed to cause the machine to perform any one or more of the methodologies discussed herein.

FIG. 8 shows a diagrammatic representation of machine in the example form of a computer system 800 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the disclosed subject matter lies in less than all features of a single disclosed embodiment. Thus the following claims are hereby incorporated into the Detailed Description, with each claim standing on its own as a separate embodiment.

What is claimed is:

1. A method comprising:
receiving, from a mobile video device located in an environment, the mobile video device operated by a user who is viewing locations in the environment, image data containing an image of a marker in the environment that has not been placed in the environment for electronic navigation purposes;
receiving a request from the mobile video device for information that locates a place in the environment, the request generated in accordance with locations in the environment that the mobile video device is focused on as the user moves in the environment and focuses the mobile video device on locations in the environment;
responsive to receiving the request, accessing a database to retrieve the requested information;
generating a scaled image of the requested information based on dimensions of the environment and the location of the place in the environment; and
transmitting the scaled image of the requested information that locates the place in the environment, for placement into the image of the environment on the mobile video device to generate an augmented reality image, the scaled image of the requested information changing in accordance with user movement and the locations of the environment that the mobile video device is focused on.

2. The method of claim 1, further comprising providing additional information with the requested information in conjunction with the augmented reality image.

3. The method of claim 2, wherein the additional information comprises an image of a direction indicator.

4. The method of claim 3 wherein the image of the direction indicator comprises further image information.

5. The method of claim 1 wherein the image of the environment comprises recognizable objects, and identity of at least one of the objects is recognized by one of RFID detection, GPS, triangulation, or facial recognition.

6. The method of claim 1 wherein the environment is a ball park, and the requested information comprises the location in the ball park of a seat, a person, a selected vendor store, a desired facility, a desired path to a parking area, or a route from the ballpark to a desired location separate from the ball park.

7. The method of claim 1, further comprising targeting an advertisement to the mobile video device based on the user's purchase history, interest, or location.

8. One or more computer-readable hardware storage device having embedded therein a set of instructions which, when executed by one or more processors of a computer, causes the computer to execute operations comprising:
receiving, from a mobile video device located in an environment, the mobile video device operated by a user who is viewing locations in the environment, image data containing an image of a marker in the environment that has not been placed in the environment for electronic navigation purposes;
receiving a request from the mobile video device for information that locates a place in the environment, the request generated in accordance with locations in the environment that the mobile video device is focused on as the user moves in the environment and focuses the mobile video device on locations in the environment;
responsive to receiving the request, accessing a database to retrieve the requested information;
generating a scaled image of the requested information based on dimensions of the environment and the location of the place in the environment; and
transmitting the scaled image of the requested information that locates the place in the environment, for placement into the image of the environment on the mobile video device to generate an augmented reality image, the scaled image of the requested information changing in accordance with user movement and the locations of the environment that the mobile video device is focused on.

9. The one or more computer-readable hardware storage device of claim 8, the operations further comprising providing additional information with the information in conjunction with the augmented reality image.

10. The one or more computer-readable hardware storage device of claim 9, wherein the additional information comprises an image of a direction indicator.

11. The one or more computer-readable hardware storage device of claim 10, wherein the image of the direction indicator comprises further image information.

12. The one or more computer-readable hardware storage device of claim 8, wherein the image of the environment comprises recognizable objects, and identity of at least one of the objects is recognized by one of RFID detection, GPS, triangulation, or facial recognition.

13. The one or more computer-readable hardware storage device of claim 8, wherein the environment is a ball park, and the requested information comprises the location in the ball park of a seat, a person, a selected vendor store, a desired facility, a desired path to a parking area, or a route from the ballpark to a desired location separate from the ball park.

14. The one or more computer-readable hardware storage device of claim 8, the operations further comprising targeting an advertisement to the mobile video device based on the user's purchase history, interest, or location.

15. A system comprising one or more hardware processors configured to include:
   a receiver module to receive, from a mobile video device located in an environment, the mobile video device operated by a user who is viewing locations in the environment, image data containing an image of a marker in the environment that has not been placed in the environment for electronic navigation purposes;
   the receiver module further to receive a request from the mobile video device for information that locates a place in the environment, the request generated in accordance with locations in the environment that the mobile video device is focused on as the user moves in the environment and focuses the mobile video device on locations in the environment;
   a database accessing module, responsive to reception of the request, to access a database to retrieve the requested information;
   one or more computer processors to generate a scaled image of the requested information based on dimensions of the environment and the location of the place in the environment; and
   a transmitter module to transmit the scaled image of the requested information that locates the place in the environment, for placement into the image of the environment on the mobile video device to generate an augmented reality image, the scaled image of the requested information changing in accordance with user movement and the locations of the environment that the mobile video device is focused on.

16. The system of claim 15, the transmitter module further to transmit additional information with the information in conjunction with the augmented reality image.

17. The system of claim 16, wherein the additional information comprises an image of a direction indicator.

18. The system of claim 15 wherein the image of the environment comprises recognizable objects, the one or more hardware processors further configured to include a location identification module to identify at least one of the recognizable objects by RFID detection, GPS, triangulation, or facial recognition.

19. The system of claim 15 wherein the environment is a ball park, and the requested information comprises the location in the ball park of a seat, a person, a selected vendor store, a desired facility, a desired path to a parking area, or a route from the ballpark to a desired location separate from the ball park.

20. The system of claim 15, the one or more hardware processors further configured to include an incentive module to target an advertisement to the mobile video device based on the user's purchase history, interest, or location.

* * * * *

UNITED STATES PATENT AND TRADEMARK OFFICE
CERTIFICATE OF CORRECTION

PATENT NO.        : 9,530,059 B2
APPLICATION NO.   : 14/963706
DATED             : December 27, 2016
INVENTOR(S)       : Matthew Scott Zises It is certified that error appears in the above-identified patent and that said Letters Patent is hereby corrected as shown below:

On the Title Page

In item (73), in "Assignee", in Column 1, Line 1, delete "eBay," and insert --eBay--, therefor On page 2, in Column 1, under "Other Publications", Line 1-2, delete "Aug. 16, 2015"," and insert --Aug. 6, 2015",--, therefor On page 2, in Column 1, under "Other Publications", Line 7, delete "Respnse" and insert --Response--, therefor On page 3, in Column 1, under "Other Publications", Line 13, delete "Aguemented" and insert --Augmented--, therefor In the Claims In Column 14, Line 11, in Claim 4, delete "claim 3" and insert --claim 3,--, therefor In Column 14, Line 13, in Claim 5, delete "claim 1" and insert --claim 1,--, therefor In Column 14, Line 17, in Claim 6, delete "claim 1" and insert --claim 1,--, therefor In Column 16, Line 17, in Claim 18, delete "claim 15" and insert --claim 15,--, therefor In Column 16, Line 23, in Claim 19, delete "claim 15" and insert --claim 15,--, therefor Signed and Sealed this
Tenth Day of April, 2018

Andrei Iancu
*Director of the United States Patent and Trademark Office*